June 24, 1930.          W. A. DOBSON          1,767,278
TYPEWRITING MACHINE
Filed July 21, 1927          2 Sheets-Sheet 1

Inventor:
William A Dobson
by B C Stickney
Attorney.

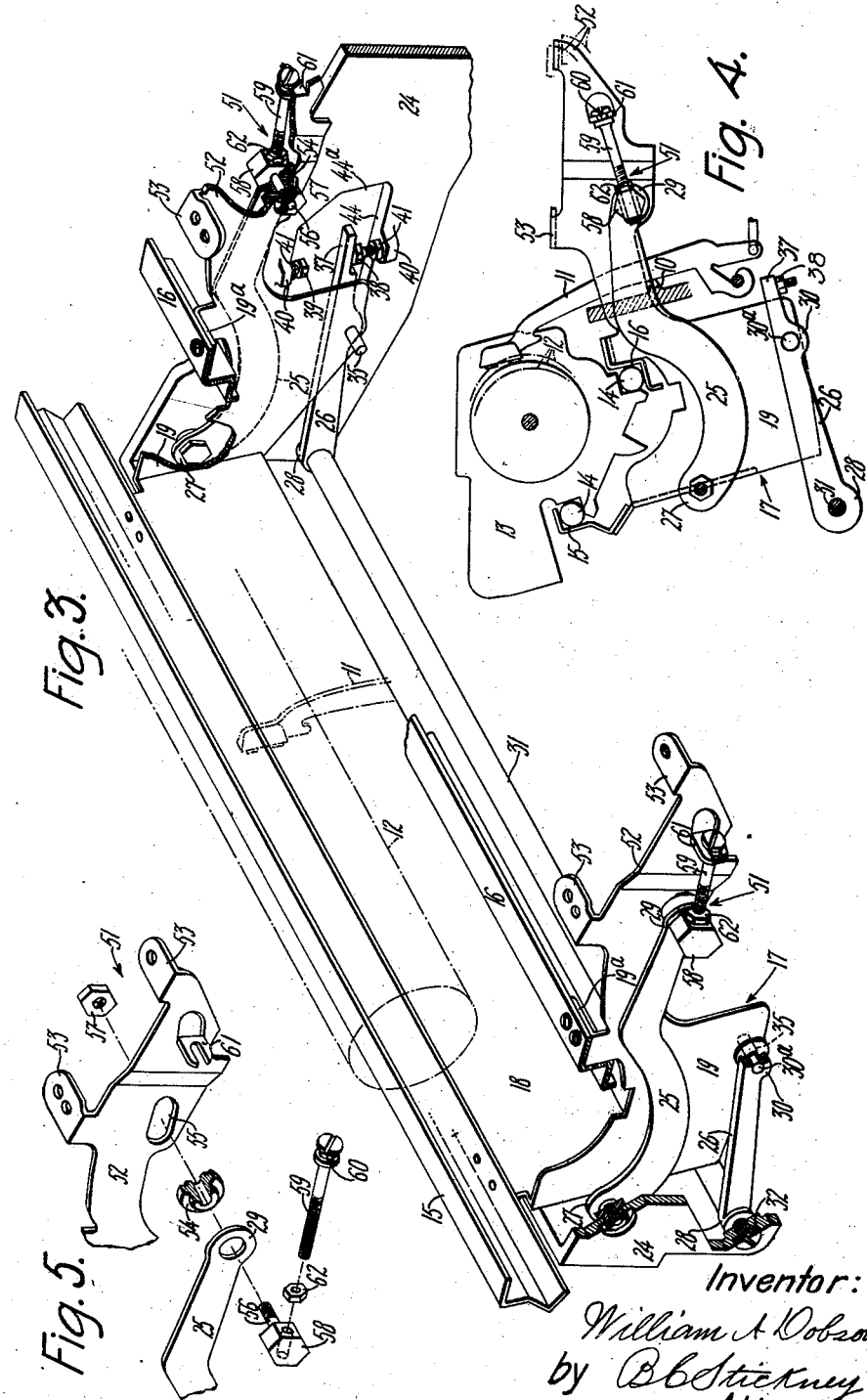

Patented June 24, 1930

1,767,278

UNITED STATES PATENT OFFICE

WILLIAM A. DOBSON, OF BRIDGEPORT, CONNECTICUT, ASSIGNOR TO UNDERWOOD ELLIOTT FISHER COMPANY, OF NEW YORK, N. Y., A CORPORATION OF DELAWARE

TYPEWRITING MACHINE

Application filed July 21, 1927. Serial No. 207,363.

This invention relates to adjusting devices for typewriter-carriage shift-frames, and is shown upon an Underwood portable typewriter.

For evenness of strength of the imprints along the platen, it is necessary to adjust the platen parallel with the plane established by the face of the types when the type-bars abut the usual stop which limits their swinging movement towards the platen at the time of printing.

The adjustment has been effected by altering the articulation of certain links of a parallel link-system, which, at either side of the machine, guides the usual shift-frame in its up-and-down case-shift or floating movement within the main frame.

The shifting mass as a whole, including the platen-carriage, etc., may thus be given a slight change of position, whereby the platen is adjusted as required.

This invention is in the nature of an improvement upon the devices disclosed in my pending application, 71,876, filed November 28, 1925, and my co-pending application, 147,594, filed November 10, 1926 (the latter being a division of Patent 1,642,196). No claim is made herein to anything disclosed in the pending application of Kurowski, 148,286, filed November 13, 1926, which is a division of Patent 1,673,687, of June 12, 1928.

A feature of the invention is the provision of an adjusting device arranged independently at either side of the machine, and governing the forward articulation point or pivot of the upper links of the parallel link-system said forward ends joining the forward ends of the shift-frame and being readily accessible in standard Underwood machines. This arrangement is particularly important for portable typewriters, where, due to the shocks suffered on account of their light and springy structure, dislocation of the platen may more easily occur, and where the operator is enabled to easily perform the readjustment of the platen without calling upon the services of an expert, and without disassembling of the machine. The adjusting means include bearings or bolts upon said floating frame, engaging said upper pivots, said bearings being adjustable in said floating frame to swing the latter backwardly and forwardly about the lower pivots.

Another feature lies in the provision of a screw mounted in each side of the floating frame to control the extended pivots of said articulation points, said screws being extremely accessible by extending forwardly of the carriage within reach of the operator. By rotating the screw, which is idling relatively to the shift-frame, the location of the shift-frame relative to the pivots may be altered.

Compactness, cheapness and simplicity aside from extreme accessibility are other features of the invention.

Other features and advantages will hereinafter appear.

In the accompanying drawings,

Figure 3 is a perspective view, showing the shift-frame linked up to the main machine-frame, which is fractionally shown to disclose the linkage and the novel adjusting device thereon.

Figure 4 is a side view of the detached shift-frame including the linkage, with the extreme positions of adjustment indicated in dot and dash.

Figure 5 is a perspective view of detached details of the novel adjusting device.

Figure 1:
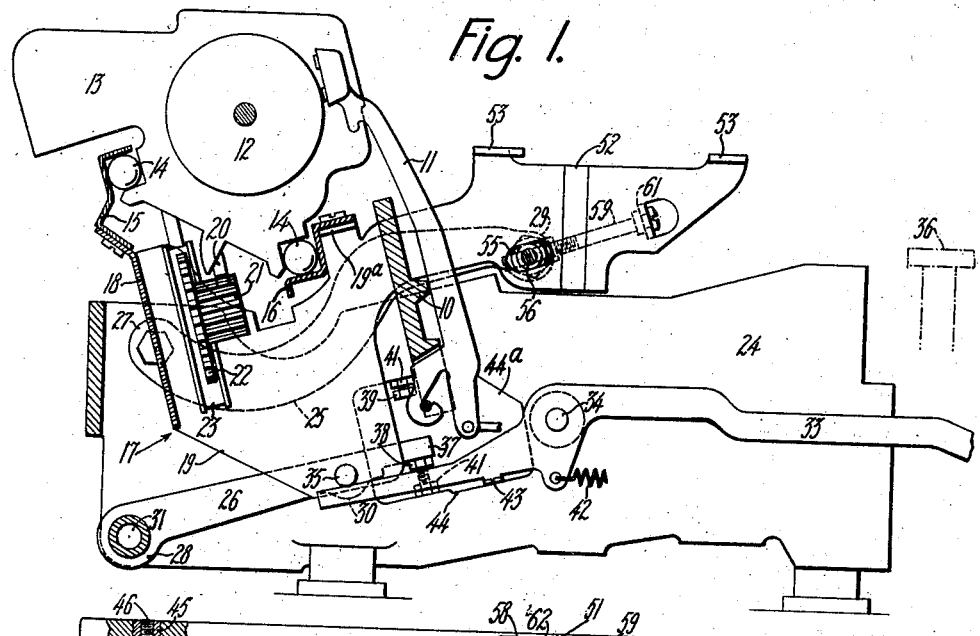
Figure 1 is a sectional side elevation of the machine, showing the general arrangement of the main parts coacting in case-shift operation.

The usual abutment 10 in Figure 1 is to determine the type-bars 11 in their swinging movement towards the platen 12, which is mounted upon the carriage 13 operating transversely of the machine by means of balls 14 upon track-rails 15 and 16, which in turn are mounted upon a track-frame 17, arranged to move up and down for upper and lower case-shift positions. The rails are shown to be of rectangular cross-section and to form a raceway wherein the carriage is secured for proper operation. The rails are mounted upon the shift-frame 17 which includes the rear plate 18 and the side plates 19 connected thereto to form a substantially U-shaped structure which is stiffened by said rail 16 being screwed to the ears 19ª which are struck up from said side plates 19. The usual means for actuating the platen-carriage upon the shift-frame for letter-spacing is indicated by a rack 20 provided on the carriage and which is associated with pinion 21, escapement 22 and spring-drum 23 provided on the shift-frame structure.

The track-frame or shift-frame 17 is operated within the main frame 24 for up-and-down case-shift movement in a plane substantially parallel to the printing plane of the type-bars. This movement is obtained by means of parallel link-connections between the shift-frame and the main frame, including an upper guide-link 25 and a lower guide-link 26 at either side of the machine. The rear ends 27 and 28 of the upper and lower guide-links respectively are pivotally connected to the main frame, and the forward ends 29 and 30 correspondingly to the side plates 19 of the shift-frame. The lower guide-links 26 in particular are forwardly connected to the shift-frame by pivots 30ª, while rearwardly secured upon a rocker-shaft 31 which is detachably journaled in the main frame by end screws 32 and which, as will be seen, conduces in operating the shift-frame for case-shift movement.

A lever 33 of the first order is indicated at the right-hand side of the machine to be fulcrumed at 34 in connection with the main frame, and is to actuate the case-shift mechanism. The rearward end of said lever is contacting with a pin 35, formed with an inward extension of pivot 30ª of the right-hand lower guide-link. Upon depressing a key 36, which is indicated in dot and dash and is to govern said case-shift lever 33, the rearward end of said lever will operatively engage said pin 35 to lift the shift-frame to its upper-case position. To limit the case-shift movement an extension 37 of the right-hand lower guide-link is operating between lower stop screws 38 and upper stop screws 39. Said stops 38 and 39 are adjustably threaded into ears 40 struck up from the main frame, and are locked in place by lock-nut 41. In Figure 1, the shift-frame is shown in lower-case position to rest its weight through extension 37 upon the lower stop screw 38. The case-shift lever then is out of function, and kept in place by counterbalance spring 42, whereby an ear 43 at the rear part of the lever is set against edge 44 of an opening 44ª provided in the main frame.

Figure 2:
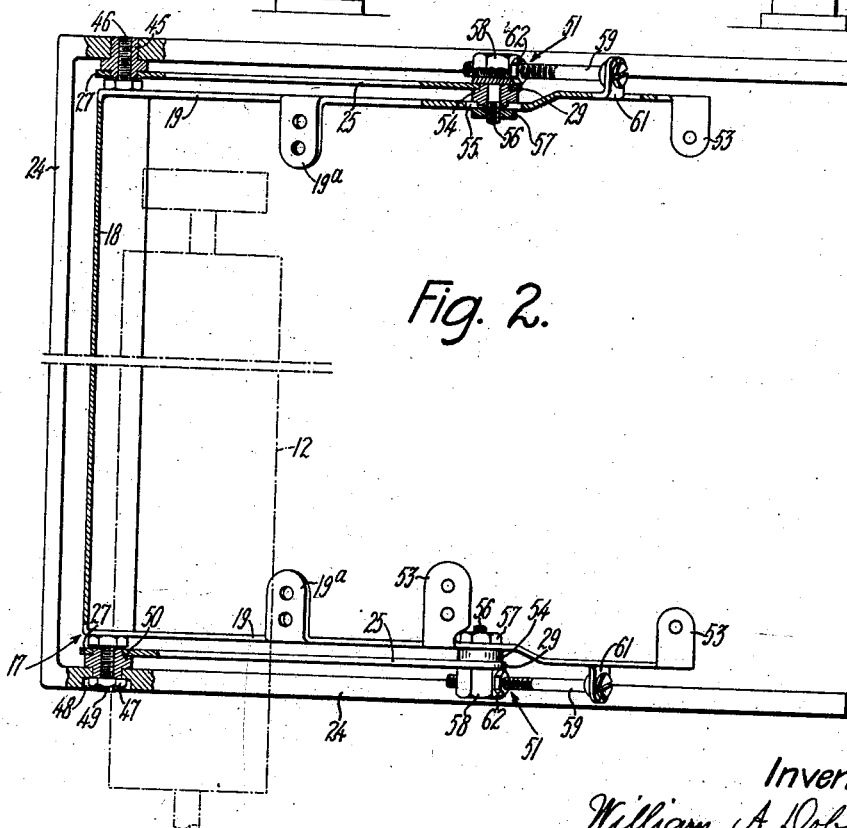
Figure 2 is a plan view, showing the shift-frame within the main frame and partly sectioned to disclose details of the adjusting device and means for laterally guiding the shift-frame.

Means to guide the shift-frame against undue lateral movement are shown in Figure 2. At the right-hand side of the machine a shouldered hub 45 is pressed into the main frame to form the pivot for the right-hand upper guide-link. A screw 46 is axially threaded into said hub to hold said link thereon, and simultaneously to serve as an adjustable right-hand lateral stop for the shift-frame. The left-hand side is similarly arranged except for an additional lock-nut 47 seated in a recess 48 of the main frame and which is to lock the adjustable stop screw 49 threaded into hub 50.

The novel platen-adjusting device at either side of the machine, collectively designated by the numeral 51, governs the forward articulation point of the upper guide-link 25 and is attached to a forwardly-projecting arm 52 of the side plate 19 which, in standard machines, is readily accessible and designed to carry the ribbon-mechanism (not shown in the drawings) by means of ears 53.

The novel device includes a shouldered hub or wrist 54 to form the forward pivot for the upper link 25 and which is adjustably mounted in a slot 55 of arm 52 of the shift-frame, whereby a screw-bolt 56 fitting into said hub and a nut 57 upon the bolt serve to hold the link in place and to clamp said hub to the shift-frame. The enlarged hexagon head 58 of said screw-bolt, in its arrangement constituting an axial extension of said hub, points outwardly to receive threaded therein and at right angles to the bolt-axis another screw 59 which is to be operated when the pivot is to be adjusted. This screw, in the nature of a micrometer, extends forwardly from said articulation point, being substantially in line with guide-link 25 and having a circumferential groove 60 at its forward end, which groove fits into the slot of an ear 61 struck up outwardly from the arm 52 so that the screw, upon rotation, may idle relatively to the shift-frame. A nut 62 is to lock said micrometer-screw 59 in place.

When platen-adjustment is desired, either side may be adjusted independently by loosening up on the nuts 57 and 62. Screw 59 is now free to be rotated in either direction, and such rotation will tend to move the shift-frame about pivots 30ª and hence the platen towards or away from the printing plane as required.

The adjusting means now are entirely withdrawn from crowded parts of the machine.

The platen-adjustment is required within very narrow limits for the above-mentioned reasons of clearness and evenness in typing. It therefore is an essential of the present invention that not only a close adjustment independently at either end of the platen is obtained, but also that the herein-employed micrometer-screw is arranged to project forwardly far enough to permit the operator in front of the machine to conveniently and accurately perform the adjustment by means of a screw-driver, key, or the like, while said exposed arrangement of the screw-head equally affords a positive measure of the amount of adjustment. For its compactness, cheapness, lightness and simplicity, the new device will greatly benefit the construction of portable typewriters.

Variations may be resorted to within the scope of the invention, and portions of the improvements may be used without others.

Having thus described my invention, I claim:

1. In a typewriting machine, the combination with a main frame, a platen-carriage mounted for case-shift movement upon a shift-frame, a parallel link-system including an upper and a lower link at either side of the machine to connect said shift-frame to the main frame and to guide its up-and-down case-shift movement within the main frame, whereby said links at their rear ends are pivoted to the main frame and at their forward ends to the shift-frame, and swinging type-bars of a device at either side of the machine to change the forward articulation point of the upper links, so as to allow either side of the shift-frame to be adjusted independently and relatively to the main frame, said device including a shouldered hub to serve as a forward pivot for the upper guide-link, said hub slidable in a slot of the shift-frame side plate, a screw to fit into said hub and having a head which holds the link in place upon the shouldered hub and having a nut to tighten up said screw, so that the shouldered hub within the slot may be secured to the shift-frame in adjusted position, and an auxiliary screw idling relatively to the shift-frame and threaded into the head of said first-mentioned screw rectangular thereto, so that, by rotation of said auxiliary screw, the shouldered hub or pivot may be adjusted within the slot to obtain proper relation between the platen-carriage and the type-bars, and means to lock said auxiliary screw in place.

2. In a typewriting machine having a main frame, the combination with a carriage, of a shifting mechanism therefor including a carriage-track-frame and means for floating said track-frame up and down, said floating means including an upper pair of links pivoted to the main frame and a lower pair of links also pivoted to the main frame, and also including means whereby said floating frame is pivoted to the lower pair of links, and also including pivots on the upper pair of links, said pivots to be adjustably mounted upon the sides of the floating frame and an adjusting screw mounted in each side of said floating frame, and means controlled by said screw for independently adjusting said floating frame relatively to said upper pivots, so as to swing the floating frame backwardly and forwardly about the lower pivots.

3. In a typewriting machine having a main frame, the combination with a carriage, of a shifting mechanism therefor including a carriage-track-frame and means for floating said track-frame up and down, said floating means including an upper pair of links pivoted to the main frame and a lower pair of links also pivoted to the main frame, and also including means whereby said floating frame is pivoted to the lower pair of links, and also including pivots on the upper pair of links and bearings upon said floating frame engaging said upper pivots, said bearings being adjustable in said floating frame to swing the latter backwardly and forwardly about the lower pivots, and an adjusting screw mounted in each side of said floating frame to control said bearings for fine adjustment thereof.

4. In a typewriting machine having a main frame, the combination with a carriage, of a shifting mechanism therefor including a carriage-track-frame and means for floating said track-frame up and down, said floating means including an upper pair of links pivoted to the main frame and a lower pair of links also pivoted to the main frame, and also including means whereby said floating frame is pivoted to the lower pair of links, and also including pivots on the upper pair of links, a clamping bolt for each of the last-mentioned pivots, to centrally fit therein, to hold the pivots upon the floating frame and adjustable to tilt the floating frame about its lower pivots, and screw-means upon said floating frame for independent fine adjustment of each bolt, so as to tilt the floating frame about its lower pivots.

5. In a typewriting machine having a main frame, the combination with a carriage, of a shifting mechanism therefor including a carriage-track-frame and means for floating said track-frame up and down, said floating means including an upper pair of links pivoted to the main frame and a lower pair of links also pivoted to the main frame, and also including means whereby said floating frame is pivoted to the lower pair of links, and also including pivots on the upper pair of links, and an adjusting screw mounted in each side of said floating frame and to directly control the location of said upper pivots relatively to the floating frame, so as to tilt the latter about its lower pivots, said upper pivots being axially extended for operative engagement with said adjusting screw.

6. In a typewriting machine having a main frame, the combination with a carriage, of a shifting mechanism therefor including a carriage-track-frame and means for floating said track-frame up and down, said floating means including an upper pair of links pivoted to the main frame and a lower pair of links also pivoted to the main frame, and also including means whereby said floating frame is pivoted to the lower pair of links, and also including pivots on the upper pair of links, and an adjusting screw mounted in each side of said floating frame to directly control the location of said upper pivots relatively to the floating frame, so as to tilt the latter about its lower pivots, said upper pivots being axially extended for operative engagement with said screw and settably located outwardly upon the side of the track-frame and forwardly of the platen-carriage to be freely accessible for manipulation.

7. In a typewriting machine having a main frame, the combination with a platen-carriage, of a shifting mechanism therefor including a carriage-track-frame and means for floating the same up and down within the main frame, said floating means including an upper and a lower link at either side of the machine to connect the sides of the floating frame to the main frame, the rear ends of said links being pivoted to the main frame, the forward ends of the links pivoted to the floating frame, and screws to directly control the location of the upper forward pivots relatively to the floating frame, so as to tilt the latter about its lower pivots, said upper pivots being axially extended for engagement with the screws and located outwardly upon the side of the shift-frame and forwardly of the platen-carriage to be freely accessible.

8. In a typewriting machine having a main frame, the combination with a platen-carriage, of a shifting mechanism therefor including a carriage-track-frame and means for floating the same up and down within the main frame, said floating means including an upper and a lower link at either side of the machine to connect the sides of the floating frame to the main frame, the rear ends of said links being pivoted to the main frame, the forward ends of the links pivoted to the floating frame, screws to directly control the location of the upper forward pivots relatively to the floating frame, so as to tilt the latter about its lower pivots, said upper pivots being axially extended for engagement with the screws and located outwardly upon the side of the shift-frame and forwardly of the platen-carriage to be freely accessible, and means to lock said screws in place.

9. In a typewriting machine having a main frame, the combination with a platen-carriage, of a shifting mechanism therefor including a carriage-track-frame and means for floating the same up and down within the main frame, said floating means including an upper and a lower link at either side of the machine to connect the sides of the floating frame to the main frame, the rear ends of said links being pivoted to the main frame, the forward ends of the links pivoted to the floating frame, screws to directly control the location of the upper forward pivots relatively to the floating frame, so as to tilt the latter about its lower pivots, said upper pivots being axially extended for engagement with the screws and located outwardly upon the side of the shift-frame and forwardly of the platen-carriage to be freely accessible, and nuts to lock said screws against said extended pivots.

10. In a typewriting machine having a main frame, the combination with a platen-carriage, of a shifting mechanism therefor including a carriage-track-frame and means for floating the same up and down within the main frame, said floating means including an upper and a lower link at either side of the machine to connect the sides of the floating frame to the main frame, the rear ends of said links being pivoted to the main frame, the forward ends of the links pivoted to the floating frame, and screws to directly control the location of the upper forward pivots relatively to the floating frame, so as to tilt the latter about its lower pivots, said upper pivots being axially extended for engagement with the screws and located outwardly upon the side of the shift-frame and forwardly of the platen-carriage to be freely accessible, each screw independently controlling one end of the floating frame and extending forwardly from the associated pivot for ready operation and observation.

11. In a typewriting machine, the combination with a main frame, a shift-frame, a platen-carriage thereon, and swingable connections between the main frame and the shift-frame at either side of the machine for floating said shift-frame up and down, said connections including an upper and a lower link at either side of the machine, said links rearwardly pivoted to the main frame and forwardly pivoted to the floating frame, of an adjusting screw at either side of the machine to independently control the forward upper articulation point of said swingable connections to tilt the shift-frame forwardly or backwardly about the lower pivots, said screw extending forwardly of the carriage within reach of the operator, and being forwardly supported upon the side of said shift-frame.

12. In a typewriting machine, the combination with a main frame, a shift-frame, a platen-carriage thereon, and swingable connections between the main frame and the shift-frame at either side of the machine for floating said shift-frame up and down, said connections including an upper and a lower link at either side of the machine, said links rearwardly pivoted to the main frame and forwardly pivoted to the floating frame, of an adjusting screw at either side of the machine to independently control the forward upper articulation point of said swingable connections to tilt the shift-frame forwardly or backwardly about the lower pivots, said screw extending forwardly of the carriage within reach of the operator, said shift-frame also extending forwardly of the carriage and beyond said forward articulation point to support said screw thereon.

13. In a typewriting machine, the combination with a main frame, a shift-frame, a platen-carriage thereon, and swingable connections between the main frame and the shift-frame at either side of the machine for floating said shift-frame up and down, said connections including an upper and a lower link at either side of the machine, said links rearwardly pivoted to the main frame and forwardly pivoted to the floating frame, of an adjusting screw at either side of the machine to independently control the forward upper articulation point of said swingable connections to tilt the shift-frame forwardly or backwardly about its lower pivots, said screw supported outside upon the side of the shift-frame and extending forwardly of the carriage within reach of the operator.

14. In a typewriting machine, the combination with a main frame, a shift-frame, a platen-carriage thereon, and swingable connections between the main frame and the shift-frame at either side of the machine for floating said shift-frame up and down, said connections including an upper and a lower link at either side of the machine, said links rearwardly pivoted to the main frame and forwardly pivoted to the floating frame, of an adjusting screw at either side of the machine to independently control a forward articulation point of said swingable connections to tilt the shift-frame forwardly or backwardly about its lower pivots, said screw supported outwardly upon the side of the shift-frame and extending forwardly of the carriage within reach of the operator and above the main frame, so as to be exposed for ready adjustment.

15. In a typewriting machine, the combination with a main frame, a shift-frame, a platen-carriage thereon, and swingable connections between the main frame and the shift-frame at either side of the machine for floating said shift-frame up and down, said connections including an upper and a lower link at either side of the machine, said links rearwardly pivoted upon the main frame and forwardly pivoted upon the floating frame, of an adjusting screw at either side of the machine to independently control a forward upper articulation point of said swingable connections to tilt the shift-frame forwardly or backwardly about its lower pivots, said screws directly controlling the pivots of said articulation points and extending forwardly of the carriage within reach of the operator and held for idling movements upon the extended sides of the shift-frame.

16. In a typewriting machine, in combination, a main frame, a shift-frame, a platen-carriage, swingable connections between the main frame and the shift-frame at either side of the machine for floating said shift-frame up and down, said connections including an upper and a lower link at either side of the machine, said links rearwardly pivoted upon the main frame and forwardly pivoted upon the floating frame, the upper forward pivots of the links being adjustable upon the shift-frame and located forwardly of the carriage, so as to be freely accessible for adjustment, and an auxiliary screw at either side of the machine to independently control the pivots of said articulation point to tilt the shift-frame forwardly or backwardly about its lower pivots, said screws extending forwardly of the carriage from said pivots within reach of the operator, and being supported upon the sides of said shift-frame.

17. In a typewriting machine, in combination, a main frame, a shift-frame, a platen-carriage, swingable connections between the main frame and the shift-frame at either side of the machine for floating said shift-frame up and down, said connections including an upper and a lower link at either side of the machine, said links rearwardly pivoted to the main frame and forwardly pivoted to the floating frame, the upper forward pivots of the links being adjustable upon the shift-frame and located forwardly of the carriage and above the main frame, so as to be freely accessible for adjustment, and an auxiliary screw supported outside upon the extended side of the shift-frame to directly control said pivots and to extend forwardly within reach of the operator, and a nut to lock said auxiliary screw against said pivot.

18. In a typewriting machine, in combination, a main frame, a shift-frame, a platen-carriage, swingable connections between the main frame and the shift-frame at either side of the machine for floating said shift-frame up and down, said connections including an upper and a lower link at either side of the machine, said links rearwardly pivoted to the main frame and forwardly pivoted to the floating frame, the upper forward pivots of the links being adjustable upon the shift-frame and located upon forwardly-extended reaches of the sides of said shift-frame, so as to be freely accessible for adjustment, and an auxiliary screw at either side, supported upon each of said reaches, to directly and independently control said pivots, said screws extending forwardly within reach of the operator.

19. In a typewriting machine, the combination with a frame, a platen, a support for the same, and links pivotally connecting the support to the frame, of members, on said support, to which said links are pivoted, assembling screws for securing the members to said support, and additional screws, held by the support, to engage the assembling screws for moving said members, perpendicularly to the axis thereof, to adjust the platen with reference to the typing point of the machine.

20. In a typewriting machine, the combination with a frame, a platen, a support for the same, and links pivotally connecting the support to the frame, of members, on said support, to which said links are pivoted, assembling screws for securing the members to said support, and additional screws, held by the support, threaded into the heads of the assembling screws, effective for moving said members, to adjust the platen with reference to the typing point of the machine.

21. In a typewriting machine, the combination with a frame, a platen, a support for the same, and links pivotally connecting the support to the frame, of members, on said support, to which said links are pivoted, assembling screws for securing the members to said support, additional screws threaded into the heads of the assembling screws to adjust the platen with reference to the typing point of the machine, and means to prevent the additional screws from turning.

WILLIAM A. DOBSON.